Jan. 30, 1934.  H. F. WAITE  1,945,241
PLATE CHANGER
Filed Jan. 5, 1932
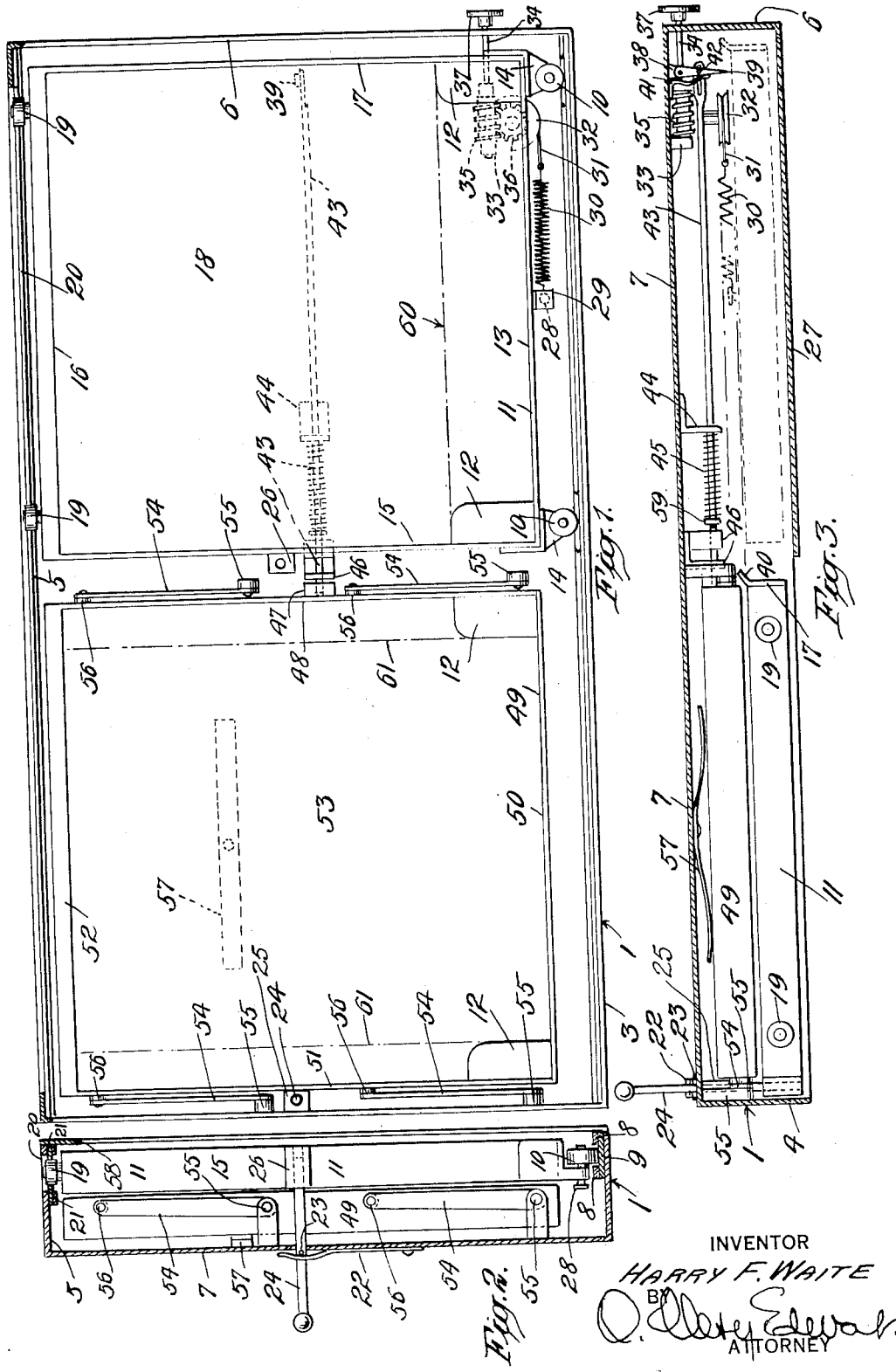
INVENTOR
HARRY F. WAITE
BY
O. Walter Edwards
ATTORNEY Patented Jan. 30, 1934

1,945,241

UNITED STATES PATENT OFFICE 1,945,241

PLATE CHANGER

Harry F. Waite, New York, N. Y.

Application January 5, 1932. Serial No. 584,810

7 Claims. (Cl. 250—34)

The object of my invention is to provide a peculiar plate changer which will hold a cassette in a suitable position for an exposure from an X-ray tube, after which the cassette may be shifted and another one automatically brought into position containing a second plate, so that after a proper shifting of the tube a second exposure may be had, whereby a stereoscopic examination is possible.

For a more particular description of my invention, reference is to be had to the accompanying drawing forming a part hereof, in which Figure 1 is a front elevation, partially in section, of a plate changer embodying my invention;

Figure 2 is a cross section of the same; and

Figure 3 is a longitudinal section, and in both these last two views, the cassette holder is at one end of the apparatus, while in Figure 1 the cassette holders are at opposite ends.

Throughout the various views of the drawing, similar reference characters designate similar parts.

My improved plate changer contains a rectangular frame 1 which is adapted to be supported by any suitable means, preferably adjustable, not shown. The frame 1 has a bottom 3, a side 4, a top 5, and a second end 6, as well as a back 7. The bottom 3 has running throughout its length two parallel strips 8, resting on a third strip 9 which may be of sound deadening material, or any suitable material. On this strip 9 run the rollers 10 of a cassette holder 11 which is adapted to hold a cassette either on or between blocks 12 that rest on the base 13 of the holder 11. This base 13 is connected to the rollers 10 by means of suitable brackets 14 and pivots. The holder 11 is also rectangular in form with a bottom 13 as above stated, a side 15, a top 16, and a second side 17 as well as a back 18 which is made of lead or similar material which is impervious to X-rays for a purpose which will appear below.

The top 16 of this holder has two outwardly extending pins on which are mounted the rollers 19 which run in a suitable slot 20 in the top 5. In the preferred embodiment of my invention, the rollers 19 engage cushioning rails 21 of any suitable material. On the back 7 and near the end 4 is fixed one end of a leaf spring 22 which is adapted to press against a pin 23 in a bolt 24 and this bolt passes through a suitable hole in the back 7 and also through a suitable guide 25 secured to the end 4, and from thence into a suitable opening in a block 26 secured to the end 15 of the cassette holder 11, so that when the bolt is shoved home it may engage this cassette holder and secure the same until withdrawn. This is essential in the embodiment of my invention herein set forth, because there is a spring which will now be described, which when free to function draws the holder 11 to the end 6 of the apparatus, and behind a lead screen 27 which covers half of the front of the same, and keeps the cassette from X-ray exposure when shifted in a manner which will now be disclosed.

The bottom 13 of the holder 11 has a rearwardly extending pin 28 below the level of the same, and mounted in a suitable bracket 29, and this pin is connected to a coil spring 30 with its other end connected to a string 31 which winds on a drum 32 pivotally mounted on a pin that is fixed in the back 7 and near the lower end of the same. This back also carries suitable bearings 33 in which is pivotally mounted a spindle 34, carrying a worm 35 which engages a corresponding gear 36 on the drum 32, so that a proper tension may be maintained on the spring 30. The spindle 34 is turned by means of a small thumb wheel 37 so as to enable the proper tension to be always maintained on the spring 30. From this, it is obvious that when the bolt 24 is withdrawn, the spring 30 will pull the cassette holder 13 behind the opaque X-ray screen 27, and at another time, when ready, this holder may be moved back to its initial position and again secured by this bolt 24.

In the foregoing has been described one cassette holder 15 and its mounting and shifting mechanism by virtue of which a cassette is shifted longitudinally of the apparatus by the releasing of a bolt and put behind an opaque screen. When behind the screen 17, a plate is protected at the rear by the lead back 18 and at the front by the screen 27, and so is free from danger of exposure. When at the left or in its initial position, the lead back 18 protects a second holder which functions in a manner which will be now described.

About midway up and near the end 6 and on the inside of the back 7 is placed a bracket 38 on which is pivotally mounted a pawl 39 which is adapted to be engaged by a projection 40 on the side 17 of the holder 11. A leaf spring 41 is fixed adjacent to the projection 38 and is arranged to press the pawl 39 towards the end 6. A pin 42 passes through this pawl 39 and is secured thereto and also engages a bolt 43 which passes through a supporting bracket 44 fixed to the back 7 and through a coil spring 45, and then through the double bracket 46, and from there into a perforated block 47 fixed to the end 48 of a cassette holder 49. This cassette holder has blocks 12 the same as the other, which rest on a bottom 50, and rising at the end remote from the end 48 is the end 51, and connecting the top of the two ends 48 and 51 is a top 52, and in addition there is a back 53 which is made of any suitable material, as sheet metal. The cassette 49 is supported by four pivoted arms 54, each of which is pivotally connected at its bottom to a bracket 55 fixed to the back 7 and at their upper ends, these links 54 are pivotally connected to blocks 56 secured to the ends 51 and 48 respectively. On the back 7 of the main frame 2 and at any suitable location is placed a leaf spring 57 which is compressed when the bolt 43 is in the position above set forth, and the holder 49 is in its rearmost position. When the bolt 43 is withdrawn by the pawl 39, the cassette holder 49 swings forward until its upper edge presses against a depending flange 58 (see Fig. 2, at the front and left end of the holder). The pawl 39 shifts the bolt 43 against the tension of the spring 45 because at one end this spring rests against the bracket 44, and at the other against a washer 59 fixed on the bolt 43 in any suitable manner.

In view of the foregoing, the functioning of my improved plate changer will be readily understood. There are two cassettes employed, one in the front cassette holder, and one in the rear. Ordinarily, these holders are placed in the apparatus in the same manner. To show how they may be placed, a dotted line 60, in Figure 1, shows how a cassette may be placed horizontally on the blocks 12 and similar lines 61 in the rear holder show how such a cassette may be placed vertically. In both cases, the top of the cassette is against the top of the holder. Assuming the parts to be in the position shown in Figures 2 and 3 in full lines, and an exposure had with the cassette of the holder 11 functioning, the bolt 24 is then withdrawn and then under the tension of the spring 30 the holder 11 is shifted behind the screen 27 as above set forth. When it is clear of the holder 49, and in nearly its terminal position, the lug 40 engages the pawl 39 and throws the same with its lower end towards the end 6 of the frame and thereby withdraws the bolt 43 so that the spring 57 functions to throw the holder 39 forward on the arms 54 and its pivots until this holder is in a proper position for functioning. After the X-ray tube has been shifted properly, a second exposure may be had in the conventional manner, and thereafter the cassettes may be removed from the apparatus and replaced by others and the operation repeated as above set forth. The holders 49 and 11 are restored to their initial positions against the tension of the springs 57 and 30, the holder 49 being the first to be put in position and thereafter the holder 11, and of course the holder 49 should be provided with a cassette before the holder 11 is put in its initial position.

While I have shown and described one embodiment of my invention, it is obvious that it is not restricted thereto, but that it is broad enough to cover all structures that come within the scope of the annexed claims.

Having thus described my invention, what I claim is:

1. A plate changer having a frame provided with two cassette holders mounted in it, said holders being located one in back of the other, spring means acting to draw the outermost one of said holders to one side of the rear holder, manually operated locking means for preventing the operation of the spring means on the holder which it engages, means acting to normally thrust the rear holder forwardly and locking means for preventing forward movement of the rear holder while the outermost holder is located in front of it.

2. A plate changer having a frame in which two cassette holders are mounted, said holders being mounted one in back of the other, means tending to normally move the outermost holder to one side of the other holder, means tending to thrust the rear holder forwardly, releasable locking means for preventing operation of the means for shifting the outermost holder, and means for preventing operation of the thrust means for the rear holder until the outermost holder has been moved from in front of the rear holder.

3. A plate changer having a frame in which two cassette holders are mounted, said holders being mounted one in back of the other, a spring acting to normally thrust the rear holder forward, a spring operative on the front holder to move it sidewise from in front of the rear holder, locking means for restraining the operation of the spring means for the outermost holder, and locking means for normally holding the rear holder retarded while the front holder is in position in front of it, said last mentioned locking means being releasable by movement of the front holder.

4. A plate changer having a frame in which two cassette holders are movably mounted, one of said holders being mounted in front of the other, means tending to thrust the rear holder forward, means tending to move the front holder sidewise to a position to one side of the rear holder, locking means for restraining movement of both holders, and means for freeing the rear holder for forward thrust after the front holder has been moved from in front of it.

5. A plate changer provided with a frame having a portion of its front face covered, two cassette holders mounted in said frame with one of the holders disposed behind the other, a spring operative behind the rear holder to normally thrust it forward toward the open portion of the front of the frame, a lock engaging said rear holder to prevent the same from being thrust forward under the impulse of the spring, a spring engaging the front holder and tending to move the same to one side of the rear holder and to a position behind the closed portion of the front of the frame, a manually operated lock for restraining such sidewise movement of the front holder, and trip means operated by the front holder for releasing the lock for the rear holder on movement of the front holder to a position behind the closed portion of the front of the frame.

6. A plate changer having a frame in which two cassette holders are mounted, one of the holders being located behind the other, means for automatically sliding the front holder sidewise in the frame from its position in front of the rear holder, means for thrusting the rear holder forward after the front holder has been moved from in front of it, a releasable lock for preventing the sliding movement of the front holder, and locking means for preventing the forward movement of the rear holder until the front holder has been moved from in front of it.

7. A plate changer having a frame in which two cassette holders are mounted, one of the holders being located behind the other, a spring operating in back of the rear holder to thrust it forward, a lock engaging the rear holder to prevent it from being thrust forward under the impulse of its spring, a spring engaging the front holder and tending to draw it to one side of the rear holder, a lock engaging the front holder to prevent it from being drawn to one side of the rear holder, and a trip member carried by the front holder for tripping the lock for the rear member when the front member moves to one side of the rear member.

HARRY F. WAITE.